US010316679B2

(12) United States Patent
Nishikawa et al.

(10) Patent No.: US 10,316,679 B2
(45) Date of Patent: Jun. 11, 2019

(54) SEAL STRUCTURE AND ROTATING MACHINE

(71) Applicant: MITSUBISHI HITACHI POWER SYSTEMS, LTD., Kanagawa (JP)

(72) Inventors: Toyoharu Nishikawa, Tokyo (JP); Yoshihiro Kuwamura, Tokyo (JP); Hiroharu Oyama, Tokyo (JP); Yoshinori Tanaka, Tokyo (JP); Shin Nishimoto, Tokyo (JP); Kazuyuki Matsumoto, Tokyo (JP); Hidekazu Uehara, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 370 days.

(21) Appl. No.: 15/106,935

(22) PCT Filed: Jan. 29, 2015

(86) PCT No.: PCT/JP2015/052553
§ 371 (c)(1),
(2) Date: Jun. 21, 2016

(87) PCT Pub. No.: WO2015/115558
PCT Pub. Date: Aug. 6, 2015

(65) Prior Publication Data
US 2016/0341058 A1 Nov. 24, 2016

(30) Foreign Application Priority Data

Jan. 30, 2014 (JP) .................................. 2014-015879

(51) Int. Cl.
*F16J 15/447* (2006.01)
*F01D 11/02* (2006.01)
(Continued)

(52) U.S. Cl.
CPC ................ *F01D 11/02* (2013.01); *F01D 9/02* (2013.01); *F01D 11/001* (2013.01); *F01D 11/08* (2013.01);
(Continued)

(58) Field of Classification Search
CPC ........ F01D 11/02; F01D 11/001; F01D 11/08; F01D 9/02; F01D 5/225; F16J 15/44; F16J 15/4472; F05D 2220/31; F05D 2250/75
See application file for complete search history.

(56) References Cited

U.S. PATENT DOCUMENTS 5,143,383 A * 9/1992 Glynn ..................... F01D 11/02
277/412
5,984,314 A * 11/1999 Peters ..................... F01D 11/02
277/412
(Continued)

FOREIGN PATENT DOCUMENTS

CN 102695849 9/2012
CN 203730771 7/2014
(Continued)

OTHER PUBLICATIONS

International Search Report dated Apr. 28, 2015 in corresponding International Application No. PCT/JP2015/052553 (with English translation).
(Continued)

Primary Examiner — Gilbert Y Lee
(74) Attorney, Agent, or Firm — Wenderoth, Lind & Ponack, L.L.P.

(57) ABSTRACT

A seal structure (2) for sealing a gap between a first structure body (10) and a second structure body (51). The seal structure includes: a peripheral surface formed on one of the first structure body and the second structure body; a plurality
(Continued)

of seal fins (5) provided at intervals in the axial direction so as to form clearances (m) together with the peripheral surface and protrusions that form re-adhesion edges between pairs of axially adjacent seal fins; the re-adhesion edges being locations at which leak currents (SL) re-adhere that have passed through a clearance (mA) of an upstream seal fin; and the protrusions forming first cavities in which eddies (B1) are created that flow along the upstream seal fin toward the second structure body, and second cavities in which currents (B2) are created that cause a contraction current effect on a clearance (mB) of a downstream seal fin.

8 Claims, 7 Drawing Sheets

(51) Int. Cl.
  *F01D 11/08* (2006.01)
  *F16J 15/44* (2006.01)
  *F01D 9/02* (2006.01)
  *F01D 11/00* (2006.01)
  *F01D 5/22* (2006.01)

(52) U.S. Cl.
  CPC .......... *F16J 15/44* (2013.01); *F16J 15/4472* (2013.01); *F01D 5/225* (2013.01); *F05D 2220/31* (2013.01); *F05D 2250/75* (2013.01)

(56) References Cited

U.S. PATENT DOCUMENTS

| | | | |
|---|---|---|---|
| 7,445,213 B1 * | 11/2008 | Pelfrey | ............... F01D 11/02 277/418 |
| 2008/0124215 A1 | 5/2008 | Paolillo et al. | |
| 2009/0072487 A1 | 3/2009 | Chougule et al. | |
| 2012/0288360 A1 | 11/2012 | Kuwamura et al. | |

FOREIGN PATENT DOCUMENTS

| | | |
|---|---|---|
| EP | 2 636 853 | 9/2013 |
| JP | 2-245581 | 10/1990 |
| JP | 2006-52808 | 2/2006 |
| JP | 2006-291967 | 10/2006 |
| JP | 2008-196522 | 8/2008 |
| JP | 2013-124554 | 6/2013 |
| KR | 10-2012-0092161 | 8/2012 |
| SU | 579439 | 11/1977 |
| WO | 2011/122092 | 10/2011 |

OTHER PUBLICATIONS

Written Opinion of the International Searching Authority dated Apr. 28, 2015 in corresponding International Application No. PCT/JP2015/052553 (with English translation).

Office Action dated Mar. 27, 2017 in corresponding Chinese Application No. 201580003408.7, with English translation.

* cited by examiner

SEAL STRUCTURE AND ROTATING MACHINE

TECHNICAL FIELD

The present invention relates to a seal structure that seals a gap between structural bodies that rotate relative to each other, in rotating machines, such as steam turbines and gas turbines, and a rotating machine including the seal structure.

Priority is claimed on Japanese Patent Application No. 2014-015879, filed Jan. 30, 2014, the content of which is incorporated herein by reference.

BACKGROUND ART

In rotating machines, such as steam turbines and gas turbines, in order to prevent a working fluid, such as steam, from leaking from a gap formed between a stationary side and a rotational side, contactless seal structures, such as a labyrinth seal, are used (for example, refer to PTL 1). A direct passage type labyrinth seal or a step type labyrinth seal is known as the labyrinth seal.

The direct passage type labyrinth seal is a seal structure that has a shroud provided at the tip of a blade and formed so as to be parallel to an inner peripheral surface of a casing that forms the contour of a rotating machine, and seal fins extending from the inner peripheral surface of the casing toward the blade, and that has a structure as seen through from an upstream side to a downstream side.

The step type labyrinth seal, as disclosed by PTL 1, is a seal structure having seal fins extending from an inner peripheral surface of a casing toward a blade, and a step-shaped shroud provided at the tip of the blade.

In a case where the numbers of seal fins and the dimensions of a gap (fin clearance) between the tip of each seal fin and an outer peripheral surface of the shroud are the same, it is said that the sealing performance of the step type labyrinth seal is higher than the linear type labyrinth seal.

CITATION LIST

Patent Literature

[PTL 1] Japanese Unexamined Patent Application, First Publication No. S2-245581

SUMMARY OF INVENTION

Technical Problem

However, in the case of the step type labyrinth seal, a step and each seal fin may come into contact with each other in a case where an expansion difference is caused between the stationary side and the rotational side. Additionally, there is a problem in that the step type labyrinth seal has higher manufacturing costs than the direct passage type labyrinth seal.

Meanwhile, a blowout effect in which a leak jet (leak current) that has passed through a clearance of an upstream seal fin reaches a clearance of a downstream seal fin while having large kinetic energy is a factor that causes the performance of the direct passage type labyrinth seal to be inferior to that of the step type labyrinth seal. Since the sealing performance degrades as the blowout increases, a direct passage type labyrinth seal having a structure that suppresses the blowout is desired.

An object of the invention is to provide a rotating machine that can reduce a leak jet leaking from a gap formed between a stationary side and a rotational side, thereby stabilizing sealing performance.

Solution to Problem

According to a first aspect of the invention, there is provided a seal structure for sealing a gap between a first structure body and a second structure body facing the first structure body in a radial direction and rotating relative to the first structure body around an axis line. The seal structure includes a peripheral surface that is formed on one of the first structure body and the second structure body and is parallel to the axis line; a plurality of seal fins that are provided in the other of the first structure body and the second structure body, protrude toward the peripheral surface, form clearances together with the peripheral surface, and are provided at intervals in the axis line direction; and a protrusion that forms a re-adhesion edge, to which a leak current having passed through a clearance of an upstream seal fin readheres, between a pair of the seal fins adjacent to each other in the axis line direction, and that forms a first cavity where an eddy flowing along the upstream seal fin toward the peripheral surface is created, and a second cavity where a current causing a contraction current effect on a clearance of a downstream seal fin is created.

According to the above configuration, the leak current that has passed through the clearance stably re-adheres to the re-adhesion edge of the protrusion. The kinetic energy of the leak current can be lost by diffusing the leak current due to the re-adhesion. Additionally, the effect of diffusing the leak current can be increased by the eddy created in the first cavity. Additionally, the leak current that passes through the clearance can be reduced due to the effect of a contraction current and the effect of kinetic energy loss which are caused by the current created in the second cavity. That is, sealing performance can be stabilized by reducing the leak current leaking from the gap between the first structure body and the second structure body.

Additionally, by forming the other of the first structure body and the second structure body as the surface parallel to the axis line, the first structure body and the second structure body do not come into contact with each other even in a case where an expansion difference is caused between the first structure body and the second structure body.

In the above seal structure, a configuration may be adopted in which the protrusion is a member having a disk surface that is connected to an upstream side of each of the seal fins and extends between the peripheral surface and the re-adhesion edge, and a cylindrical surface that is a surface of a cylinder concentric with the axis line extending between the re-adhesion edge and the seal fin, and having a rectangular shape when seen from a circumferential direction.

According to the above configuration, as the position of the re-adhesion edge is fixed, the re-adhesion point of the leak current can be stabilized.

In the above seal structure, the re-adhesion edge of the protrusion may be a protruding strip that protrudes from the cylindrical surface toward the other structure body and extends in the circumferential direction.

According to the above configuration, as the re-adhesion edge is formed as the protruding strip, the eddy created in the first cavity and the current created in the second cavity are stably formed. Accordingly, the effect of reducing the leak current can be promoted.

In the above seal structure, a configuration may be adopted in which the protrusion is a cylindrical member that is connected to the upstream surface of each of the seal fins and is concentric with the axis line extending between the re-adhesion edge and the seal fin, and that forms a third cavity where an eddy is formed between the protrusion and the peripheral surface.

According to the above configuration, the weight of the seal fins can be reduced by reducing the volume of the protrusion.

In the above seal structure, a configuration may be adopted in which a second protruding strip part, which protrudes toward the peripheral surface, which extends in a circumferential direction, and which promotes creation of an eddy created in the third cavity, is formed between the upstream seal fin and the re-adhesion edge in the axis line direction on the surface of the peripheral surface between the pair of seal fins adjacent to each other in the axis line direction.

According to the above configuration, the creation of the eddy created in the third cavity can be promoted by providing the second protruding strip part on the peripheral surface.

In the above seal structure, a configuration may be adopted in which a protruding strip part, which protrudes toward the peripheral surface, which extends in a circumferential direction, and which creates an eddy causing a contraction current effect on the clearance of the downstream seal fin in the second cavity, is formed between the upstream seal fin and the re-adhesion edge in the axis line direction on the surface of the other structure body between the pair of seal fins adjacent to each other in the axis line direction.

According to the above configuration, the blowout of the leak current can be prevented, and due to the eddy created in the second cavity, the dissipation of kinetic energy is promoted, the contraction current becomes strong, and the flow rate of the leak current can be further reduced.

Additionally, the invention provides a rotating machine including any one of the above seal structures.

Advantageous Effects of Invention

According to the invention, sealing performance can be stabilized by reducing the leak current leaking from the gap between the first structure body and the second structure body. Additionally, the first structure body and the second structure body do not come into contact with each other even in a case where an expansion difference is caused between the first structure body and the second structure body.

DESCRIPTION OF EMBODIMENTS

First Embodiment

Hereinafter, a steam turbine that is a rotating machine of a first embodiment of the invention will be described with reference to the drawings.

Figure 1:
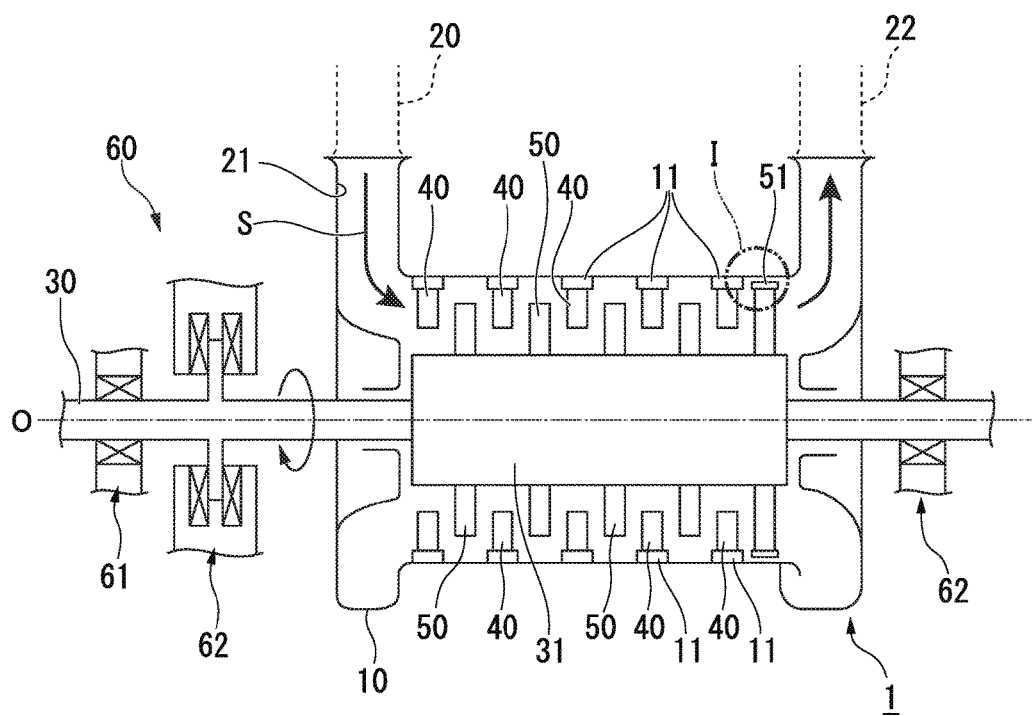
FIG. 1 is a sectional view showing the schematic configuration of a steam turbine related to a first embodiment of the invention.

As shown in FIG. 1, the steam turbine 1 of the present embodiment includes a casing 10, a rotating shaft 30 that is rotatably provided inside the casing 10 and transmits power to machines, such as a power generator (not shown), vanes 40 that are held by the casing 10, blades 50 that are provided in the rotating shaft 30, and a bearing section 60 that supports the rotating shaft 30 so as to be rotatable around an axis.

The steam S is introduced from a mainstream inlet 21 formed in the casing 10 via a steam supply tube 20 connected to a steam supply source (not shown), and is discharged from a steam discharge pipe 22 connected to a downstream side of the steam turbine 1.

An internal space of the casing 10 is sealed in an airtight manner and is formed as a flowpath for the steam S. Ring-shaped outer partition plate rings 11 through which the rotating shaft 30 is inserted are firmly fixed to an inner wall surface of this casing 10.

The bearing section 60 includes a journal bearing unit 61 and a thrust bearing unit 62, and rotatably supports the rotating shaft 30.

The vanes 40 extend from the casing 10 toward an inner peripheral side, and constitute multiple annular vane groups that are radially arranged so as to surround the rotating shaft 30. The vanes 40 are held by the outer partition plate rings 11, respectively.

The plurality of annular vane groups each consisting of the plurality of vanes 40 are formed at intervals in an axial direction (hereinafter simply referred to as an axial direction) of the rotating shaft 30. The annular vane groups each consisting of the plurality of vanes 40 convert steam pressure energy into kinetic energy and make the steam flow into blades 50 adjacent to a downstream side.

The blades 50 are firmly attached to an outer peripheral part of a rotating shaft body 31 of the rotating shaft 30. A number of the blades 50 are radially arranged on a downstream side of each annular vane group so as to constitute an annular blade group. A set of an annular vane group and an annular blade group forms one stage.

Among these, a tip part of a blade 50 in a final stage is coupled to a tip part of a blade 50 adjacent thereto in a circumferential direction (hereinafter simply referred to as a circumferential direction) of the rotating shaft 30. The tip parts of the blades 50 coupled together in the final stage are referred to as a shroud 51.

Figure 2:
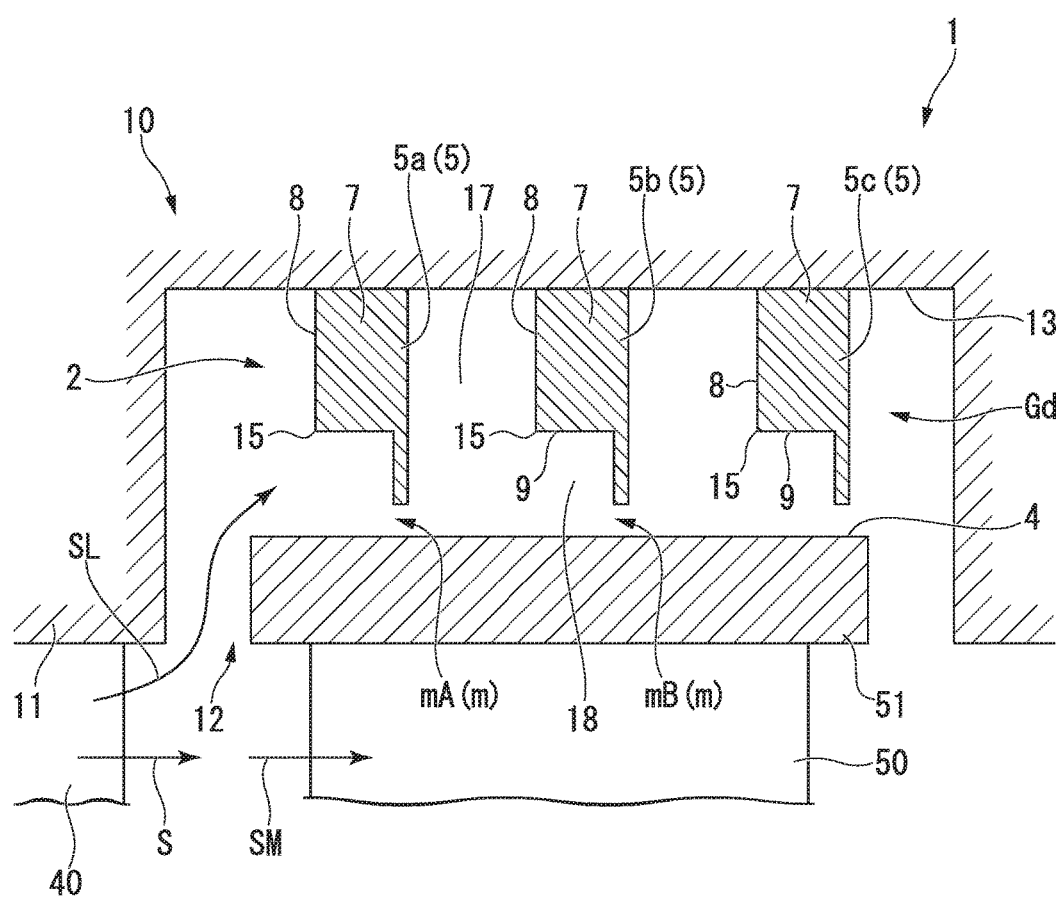
FIG. 2 is an enlarged sectional view of main parts of the steam turbine related to the first embodiment of the invention, and is an enlarged sectional view of portion I of FIG. 1.

As shown in FIG. 2, a cylindrical annular groove 12 that is enlarged in diameter from an inner peripheral part of an outer partition plate ring 11 and has an inner peripheral surface of the casing 10 as a bottom surface 13 is formed on a downstream side of the outer partition plate ring 11 in the axial direction. The shroud 51 is housed in the annular groove 12, and the bottom surface 13 faces the shroud 51 in the radial direction via a gap Gd.

The shroud 51 has a cylindrical outer peripheral surface 4 (peripheral surface) parallel to the bottom surface 13 formed therein. The shroud 51 forms a peripheral surface parallel to an axis line O of the rotating shaft 30 (refer to FIG. 1).

The bottom surface 13 is provided with a plurality of seal fins 5 that extend in the radial direction toward the outer peripheral surface 4 of the shroud 51. Three seal fins 5a, 5b, and 5c are shown in FIG. 2. The seal fins 5 extend from the bottom surface 13 to a radial inner peripheral side toward the outer peripheral surface 4 of the shroud 51, respectively, at predetermined intervals in the axial direction, and extend in the circumferential direction.

That is, the gap Gd between the casing 10 and the blade 50 of the present embodiment is provided with a seal structure 2 that is a direct passage type labyrinth seal. By adopting the direct passage type labyrinth seal, the seal structure 2 is a structure that is seen through from the upstream side to the downstream side.

The seal fins 5 form minute gaps m (fin clearances) with the shroud 51 in the radial direction. Hereinafter, a gap between the seal fin 5a (hereinafter referred to as an upstream seal fin) on the upstream side out of a pair of seal fins 5 adjacent to each other in the axial direction among the plurality of seal fins 5, and the outer peripheral surface 4 is referred to as an upstream gap mA, and a gap between the seal fin 5b (hereinafter referred to as a downstream seal fin) on the downstream side out of the seal fins and the outer peripheral surface 4 is referred to as a downstream gap mB.

The respective dimensions of the minute gaps m (mA, mB) are set within a range where the seal fins 5 and the blade 50 do not come into contact with each other in consideration of the thermal expansion of the casing 10 or the blade 50, the centrifugal expansion of the blade 50, or the like.

A projection 7 (protrusion) is integrally attached to an upstream surface of each seal fin 5. The projection 7 is a solid member of which a sectional shape when seen from the circumferential direction is a rectangular shape, and extends in the circumferential direction together with the seal fin 5.

The projection 7 has a disk surface 8 orthogonal to an axis line direction on the upstream side of the seal fin 5, and a cylindrical surface 9 that is a surface of a cylinder that is orthogonal to the disk surface 8, extends in the circumferential direction, and is concentric with the axis line. A ridgeline where the disk surface 8 and the cylindrical surface 9 intersect each other is a re-adhesion edge 15. In other words, the disk surface 8 and the cylindrical surface 9 are surfaces for determining the position of the re-adhesion edge 15.

By forming the projection 7 in such a shape, a first cavity 17 formed by the upstream seal fin 5a, the disk surface 8 of the projection 7, and the outer peripheral surface 4, and a second cavity 18 formed by the downstream seal fin 5b, the cylindrical surface 9 of the projection 7, and the outer peripheral surface 4 are formed in a space between the upstream seal fin 5a and the downstream seal fin 5b.

When seen from an end side of the seal fin 5, the first cavity 17 is deep in the radial direction, and the second cavity 18 is a cavity that is shallow in the radial direction as compared to the first cavity 17.

Here, the operation of the steam turbine 1 having the above configuration will be described.

First, steam S flows into the internal space of the casing 10 via the steam supply tube 20 from the steam supply source, such as a boiler (not shown).

The steam S that has flowed into the internal space of the casing 10 passes sequentially through the annular vane groups and the annular blade groups in the respective stages.

In the annular vane group of each stage, the steam S increases a circumferential velocity component of the steam S while passing through the vanes 40. Most steam SM (refer to FIG. 2) of the steam S flows between the blades, the energy of the steam SM is converted into rotational energy, and rotation is applied to the rotating shaft 30.

Meanwhile, some (for example, about several percents of) leak jet SL (a leak current) of the steam S flows into the annular groove 12 in a state (swirling current) where a strong circumferential component is maintained after flowing out of the vanes 40.

Figure 3:
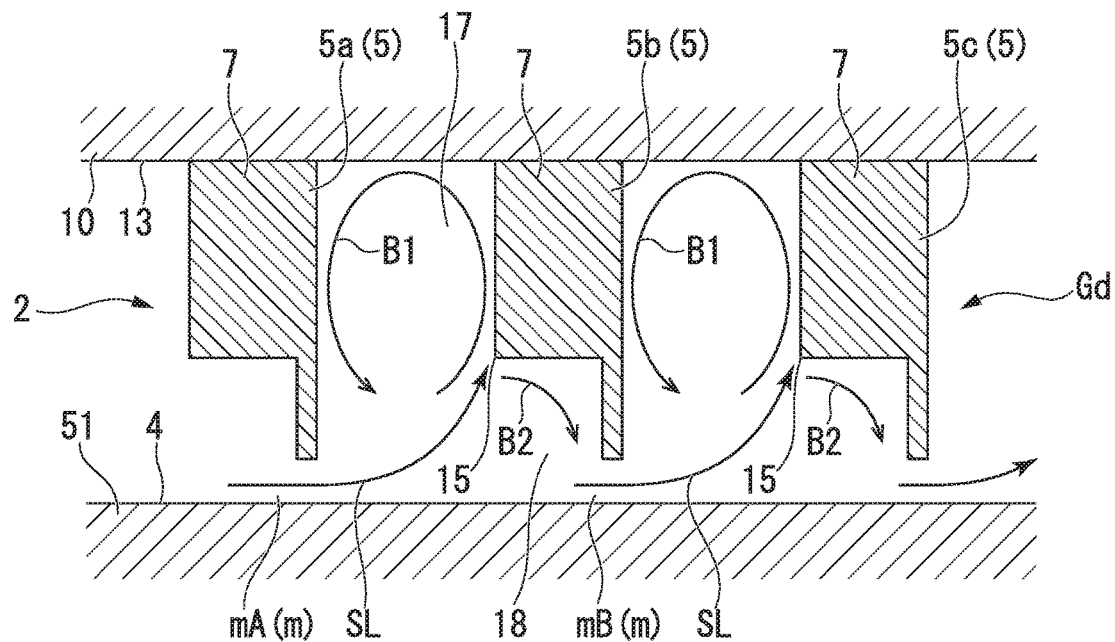
FIG. 3 is a schematic view showing the behavior of leak jets and eddies in a seal structure of the first embodiment of the invention.

As shown in FIG. 3, the leak jet SL that has passed through the upstream gap mA of the upstream seal fin 5a is stably re-adhered to the re-adhesion edge 15 of the projection 7 formed on the downstream seal fin 5b. That is, the leak jet SL is further diffused between the upstream seal fin 5a and the downstream seal fin 5b, and the kinetic energy of the leak jet SL is lost.

Additionally, as the leak jet SL re-adheres to the re-adhesion edge 15, an eddy B1 is formed in the first cavity 17. Accordingly, the effect of diffusing the leak jet SL is increased and the loss of the kinetic energy of the leak jet SL is also increased.

Additionally, a current B2 that causes a contraction current effect in the second cavity 18 is created due to a current that causes the leak jet SL to re-adhere to the re-adhesion edge 15. Here, the contraction current means that the width of a current is narrowed as a fluid passes through a gap. As the contraction current being strengthened, it is difficult for the fluid to pass through the gap.

Figure 4:
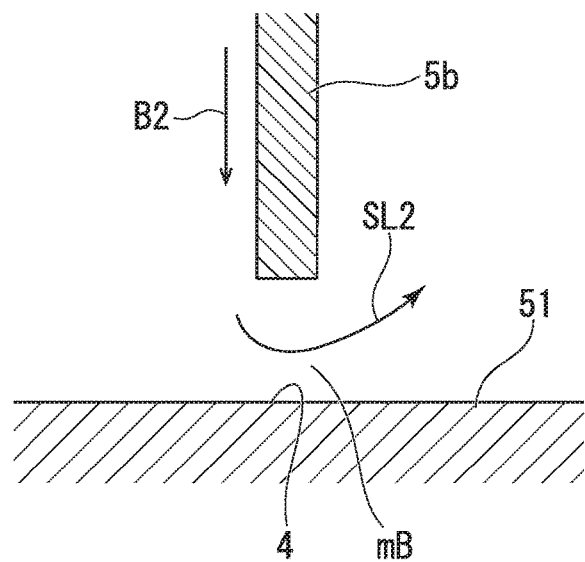
FIG. 4 is a detailed explanatory view of a leak jet that passes through a downstream gap between a downstream seal fin and a base surface in the first embodiment of the invention.

As shown in FIG. 4, since the current B2 collides against the downstream seal fin 5b and contracts a leak jet SL2 that passes through the downstream gap mB, the leak jet SL2 is reduced.

Here, the shape of the seal fins of the present embodiment will be described from another viewpoint.

As an existing technique, it is known that, in a case where the interval (fin pitch) between a pair of adjacent seal fins, and the minute gaps are the same, the flow rate of a leak jet becomes smaller as the depth of cavities formed by the pair of seal fins and the bottom surface is smaller. This is because the leak jet easily re-adheres to the bottom surface if the depth of the cavities is smaller; therefore, the angle of diffusion becomes larger and the dissipation of kinetic energy becomes larger. In a case where the depth of the cavities is large, the leak jet adheres to the downstream seal fin instead of the bottom surface. For this reason, the angle of diffusion becomes smaller, and the dissipation of kinetic energy becomes smaller.

It is known that, if the fin pitch is defined as L1 and the depth of the cavities is defined as H, the flow rate of the leak jet can be made small by setting the ratio H/L1 of the fin pitch and the depth to about 0.25.

Figure 5:
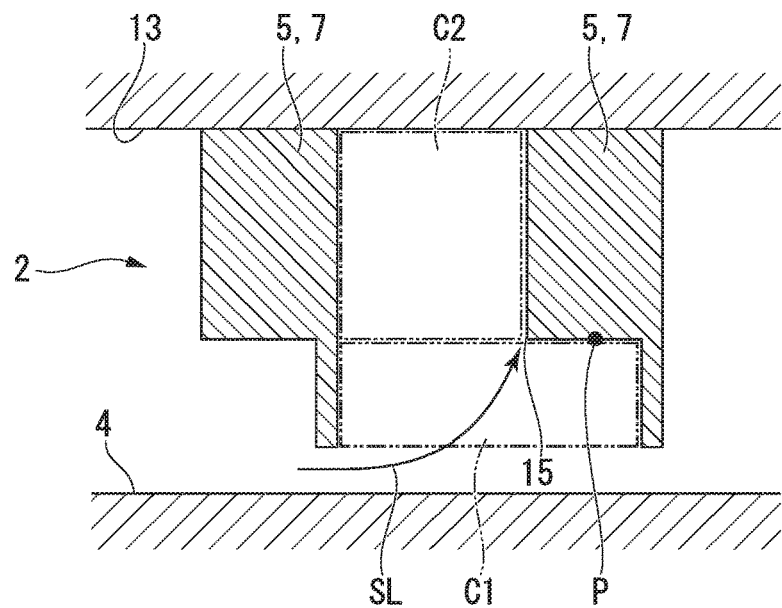
FIG. 5 is a sectional view showing the shape of seal fins of the seal structure of the first embodiment of the invention.

As shown in FIG. 5, the shape of the cavities of the present embodiment can be described as a shape such that a recess C2 is provided on the upstream side of a cavity C1 that is a shallow groove and the depth on the upstream side of the cavity C1 is made large. By adopting such a shape, the re-adhesion edge 15 is formed, and the re-adhesion edge 15 becomes a stable re-adhesion point.

If a re-adhesion point, in a case there is no recess C2, is defined as P, the re-adhesion point moves to the upstream side. That is, the angle of diffusion can become even larger due to the movement of the re-adhesion point to the upstream side, and consequently, the kinetic energy of the leak jet SL can be dissipated.

Next, the dimensions that specify the shape of the seal structure 2 of the present embodiment, such as the re-adhesion edge 15 will be described.

The position of the re-adhesion edge 15 is set to a position where the leak jet SL that has passed through the upstream gap mA easily re-adheres. For example, the position of the re-adhesion edge 15 is appropriately calculated by using analysis or the like using computational fluid dynamics (CFD) according to the specification of the steam turbine 1, for example, the interval between the shroud 51 and the bottom surface 13, the flow rate of the leak jet SL, or the like.

Figure 6:
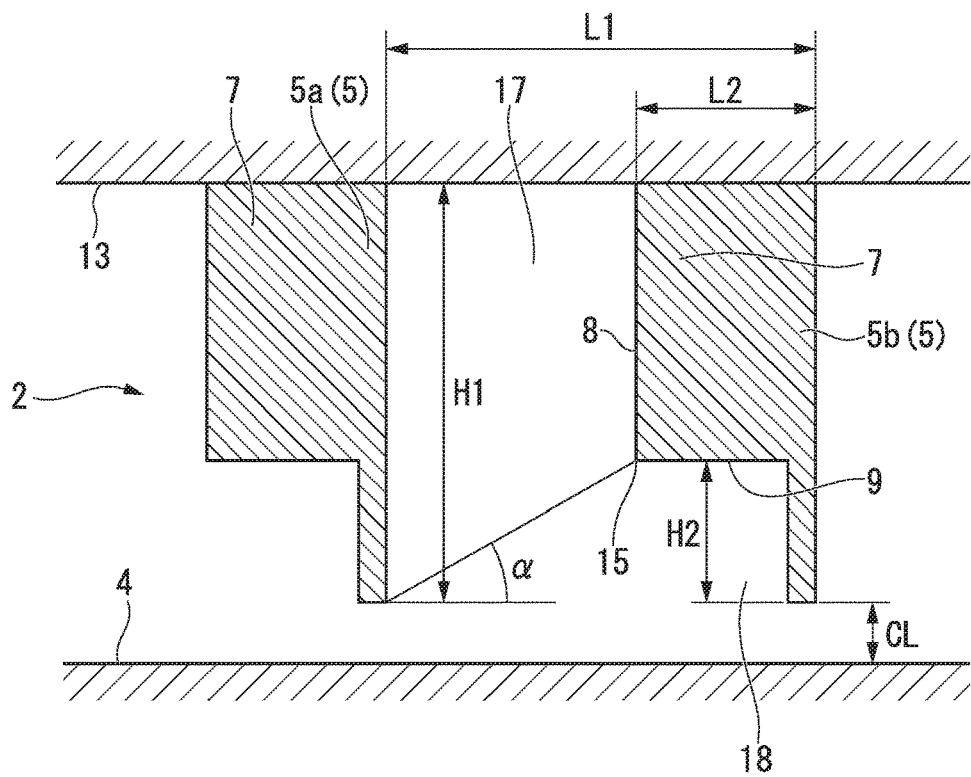
FIG. 6 is a sectional view showing parameters that determine the shape of the seal fins of the seal structure of the first embodiment of the invention.

The shape of the seal structure 2 of the present embodiment can be determined by four parameters. The four parameters will be described with reference to FIG. 6.

A first parameter is a ratio L2/L1 of the width L2 of the projection 7 to the fin pitch L1. The fin pitch L1 is an interval between the upstream seal fin 5a and the downstream seal fin 5b. The width of the projection 7 is an axial interval between the disk surface 8 of the projection 7 and each seal fin 5.

A second parameter is a ratio H2/L1 of the depth H2 of the second cavity 18 to the fin pitch L1. The depth H2 of the second cavity 18 is an interval between the end of each seal fin 5 in the radial direction and the cylindrical surface 9 of the projection 7. A third parameter is a ratio H1/L1 of the depth H1 of the first cavity 17 to the fin pitch L1. The depth H1 of the first cavity 17 is an interval between the end of each seal fin 5 in the radial direction and the bottom surface 13.

A fourth parameter is a ratio L1/CL of the fin pitch L1 to a clearance CL.

It is preferable that the ratio L2/L1 of the width L2 of the projection 7 to the fin pitch L1 that is the first parameter is, for example, 0.05 to 0.3. For example, it is not preferable to set L2/L1 to 0.5 or the like and to increase the width L2 of the projection 7. The reason is because an angle α from the end of the upstream seal fin 5a toward the re-adhesion edge 15 becomes too large and the leak jet SL no longer re-adheres to the re-adhesion edge 15.

It is preferable that the ratio H2/L1 of the depth H2 of the second cavity 18 to the fin pitch L1 that is the second parameter is, for example, 0.05 to 0.3. For example, it is not preferable to set H2/L1 to 0.5 or the like and to increase the depth H2 of the second cavity 18. The reason is because the angle α becomes too large and the leak jet SL no longer re-adheres to the re-adhesion edge 15.

It is preferable that the ratio H1/L1 of the depth H1 of the first cavity 17 to the fin pitch L1 that is the third parameter is larger because the fin pitch L1 becomes smaller, and it is preferable that the ratio is 0.5 or more.

The ratio L1/CL of the fin pitch L1 to the clearance CL that is the fourth parameter is not particularly specified not only because the clearance CL differs at the time of stop and at the time of operation, but also the clearance also varies depending on operation conditions. It is preferable that the ratio L1/CL of the fin pitch L1 to the clearance CL is set after the detailed specification of a device is determined.

According to the above embodiment, the leak jet SL that has passed through each minute gap m stably re-adheres to the re-adhesion edge 15 of the projection 7. The kinetic energy of the leak jet SL can be lost by diffusing the leak jet SL due to the re-adhesion.

Additionally, the effect of diffusing the leak jet SL can be increased by the eddy B1 created in the first cavity. Additionally, the leak jet SL that passes through the downstream gap mB can be reduced due to the effect of a contraction current and the effect of kinetic energy loss which are caused by the current B2 created in the second cavity.

Additionally, by using the direct passage type labyrinth seal as the seal structure, a stationary side does not come into contact with a rotational side even in a case where an expansion difference is caused between the rotating shaft 30 that is the rotational side and the casing that is the stationary side.

Additionally, by using the member, which is rectangular when seen from the circumferential direction, as the projection 7, the position of the re-adhesion edge 15 can be fixed, and the re-adhesion point of the leak jet SL can be stabilized.

In addition, although the disk surface 8 of the present embodiment is formed such that a principal surface thereof is orthogonal to the axis line O, the disk surface is not limited thereto if the position of the re-adhesion edge 15 can be maintained as set. For example, the disk surface 8 may have a shape that is inclined to the upstream side as the disk surface becomes closer to a radial outer peripheral side.

Similarly, the cylindrical surface 9 of the present embodiment may also have a shape that is inclined to the radial inner peripheral side as the cylindrical surface become closer to the down streamside.

Additionally, the projection 7 may not be solid, but may have a hollow structure.

Second Embodiment

Hereinafter, a seal structure of a second embodiment of the invention will be described with reference to a drawing. In addition, the present embodiment will be described mainly about differences from the above-described first embodiment, and the description of the same portions will be omitted.

Figure 7:
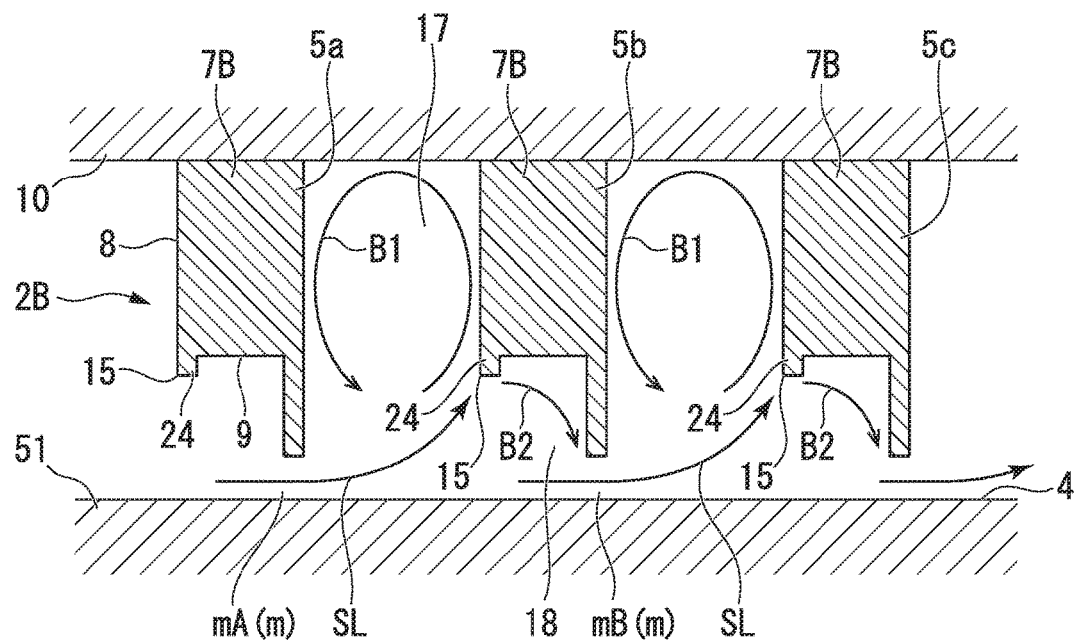
FIG. 7 is a sectional view of a seal structure of a second embodiment of the invention.

As shown in FIG. 7, a fin-side protruding strip part 24, which is a protruding strip that protrudes toward the outer peripheral surface 4 of the shroud 51 from an upstream end of the cylindrical surface 9 and extends in the circumferential direction, is formed on a projection 7B of a seal structure 2B of the present embodiment. In other words, the re-adhesion edge 15 of the projection 7 is the fin-side protruding strip part 24 that is the protruding strip that protrudes toward the shroud 51 from the cylindrical surface 9 and extends in the circumferential direction.

The leak jet SL that has passed through the upstream gap mA re-adheres to the re-adhesion edge 15 of the downstream seal fin 5b. In this case, as the re-adhesion edge 15 protrudes toward the radial inner peripheral side, the eddy B1 and the current B2 are clearly separated from each other. That is, the eddy B1 and the current B2 are stably formed.

According to the above embodiment, the eddy B1 created in the first cavity by the fin-side protruding strip part 24 and the current B2 created in the second cavity are stably formed. Accordingly, the effect of reducing the leak jet SL can be promoted.

Third Embodiment

Hereinafter, a seal structure of a third embodiment of the invention will be described with reference to a drawing.

Figure 8:
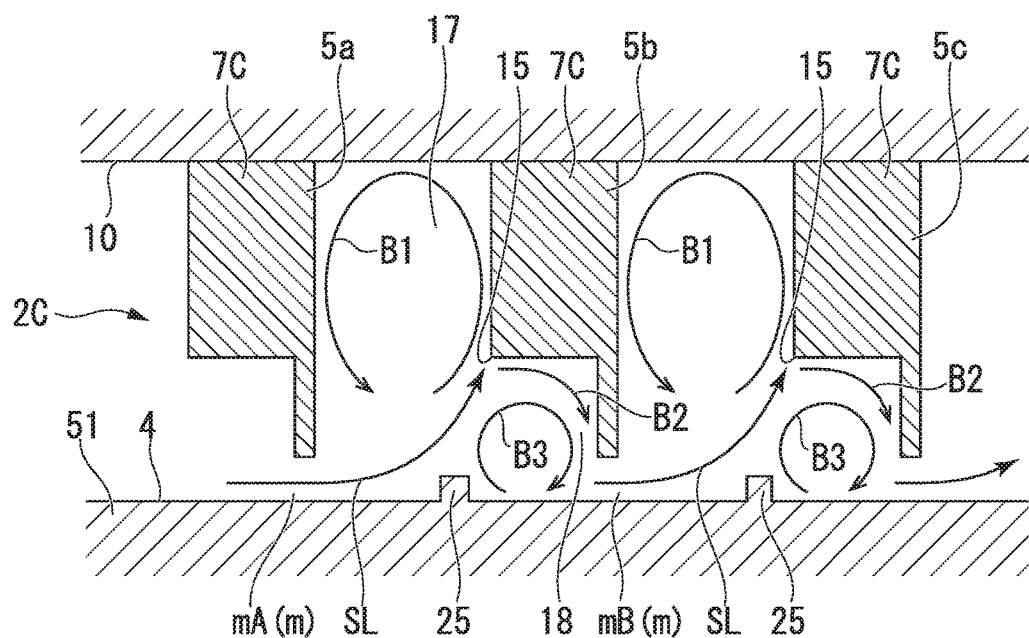
FIG. 8 is a sectional view of a seal structure of a third embodiment of the invention.

As shown in FIG. 8, a rotational-side protruding strip part 25 (third protruding strip part), which is a protruding strip that protrudes toward the bottom surface 13 and extends in the circumferential direction, is formed between the upstream seal fin 5a and the re-adhesion edge 15 in the axial direction, on the outer peripheral surface 4 of the shroud 51 of a seal structure 2C of the present embodiment.

In other words, the rotational-side protruding strip part 25, which is formed so that a fluid flowing along the outer peripheral surface 4 is peeled off from the outer peripheral surface 4, is formed on the outer peripheral surface 4 of the shroud 51 that is the rotational side.

The protruding strip part 25 is formed such that the height thereof in the radial direction from the outer peripheral surface 4 is lower than the dimension of each minute gap m. That is, the protruding strip part 25 has a height such that the rotational-side protruding strip part 25 and each seal fin 5 do not come into contact with each other, even in a case where an expansion difference is caused between the rotating shaft 30 that is the rotational side and the casing 10 that is the stationary side.

As the leak jet SL that has passed through the upstream gap mA collides against the rotational-side protruding strip part 25, blowout of the leak jet SL is reduced. In detail, the leak jet SL to blow out toward the downstream gap mB from the upstream gap mA without re-adhering to the re-adhesion edge 15 collides against the rotational-side protruding strip part 25 formed on the outer peripheral surface 4 of the shroud 51. Accordingly, the blowout effect in the direct passage type labyrinth seal can be suppressed.

Additionally, as the blowout of the leak jet SL is reduced by the rotational-side protruding strip part 25, an eddy B3 is created in the second cavity 18. As the eddy B3 is created on the upstream side of the downstream seal fin 5b, the dissipation of kinetic energy is promoted, the contraction current becomes strong, and the flow rate of the leak jet SL can be further reduced.

In addition, the axial position of the rotational-side protruding strip part 25 is appropriately set to a position where the blowout of the leak jet SL that re-adheres to the re-adhesion edge 15 is prevented and the creation of the eddy B3 created in the second cavity 18 is not hindered.

According to the above embodiment, the blowout of the leak jet SL can be prevented, and due to the eddy B3 created in the second cavity 18, the dissipation of kinetic energy is promoted, the contraction current becomes strong, and the flow rate of the leak jet SL can be further reduced.

Fourth Embodiment

Hereinafter, a seal structure of a fourth embodiment of the invention will be described with reference to a drawing.

Figure 9:
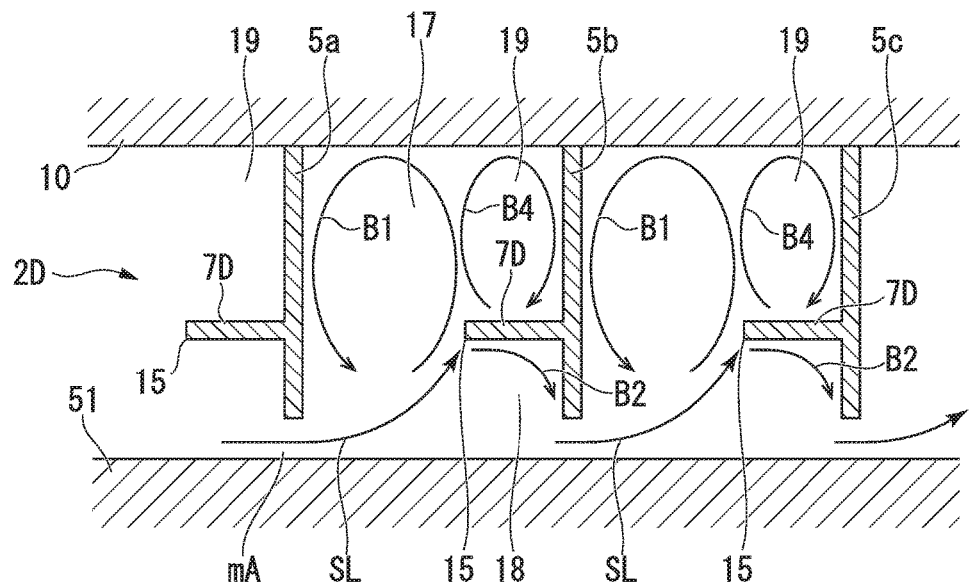
FIG. 9 is a sectional view of a seal structure of a fourth embodiment of the invention.

As shown in FIG. 9, a projection 7D of a seal structure 2D of the present embodiment is a cylindrical member that protrudes from an upstream surface of each seal fin 5 to the upstream side and extends in the circumferential direction. In other words, the projection 7D is a cylindrical member that is connected to the upstream surface of each seal fin 5, and is concentric with an axis line O extending between the re-adhesion edge 15 and the seal fin 5 (refer to FIG. 1).

The leak jet SL that has passed through the upstream gap mA re-adheres to the re-adhesion edge 15 that is an upstream end of the projection 7D, similar to the first embodiment. Accordingly, in addition to the eddy B1 and the current B2, the eddy B4 is formed also in the third cavity 19 that is a space between the projection 7D and the bottom surface 13.

According to the above embodiment, the same effects as those of the seal structure 2 of the first embodiment can be obtained by the projection having a shape different from that of the first embodiment. Specifically, the weight of the seal fins can be reduced by reducing the volume of the projection.

Next, the seal structure of a first modification example of the fourth embodiment will be described.

Figure 10:
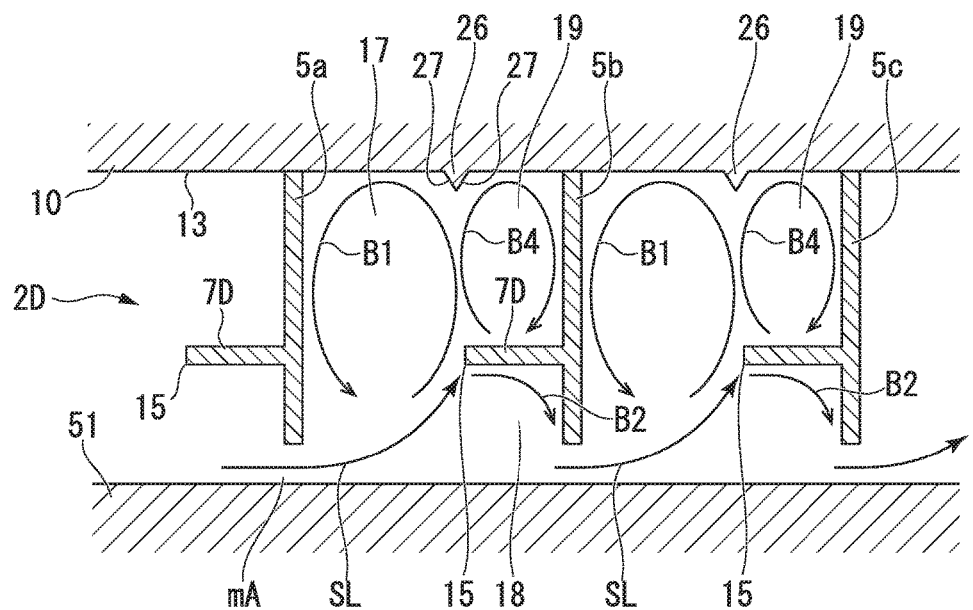
FIG. 10 is a sectional view of the seal structure of a first modification example of the fourth embodiment of the invention.

As shown in FIG. 10, the seal structure 2D of the first modification example of the fourth embodiment has a configuration in which the stability of an eddy is achieved by forming a triangular protruding strip part 26 (second protruding strip part), which is a triangular protruding strip, on the bottom surface 13 of the seal structure 2D of the fourth embodiment.

Specifically, the triangular protruding strip part 26 is a protruding strip that protrudes toward the outer peripheral surface 4 of the shroud 51, which is the rotational side and extends in the circumferential direction, between the upstream seal fin 5a and the re-adhesion edge 15 in the axis line direction on the bottom surface 13. The triangular protruding strip part 26 has a pair of inclined surfaces 27 that divide a current from the radial inner peripheral side toward the radial outer peripheral side into an axial upstream side and an axial downstream side.

According to the above modification example, the creation of the eddy B4 created in the third cavity 19 can be promoted by providing the triangular protruding strip part 26 on the bottom surface 13.

Next, the seal structure of a second modification example of the fourth embodiment will be described.

Figure 11:
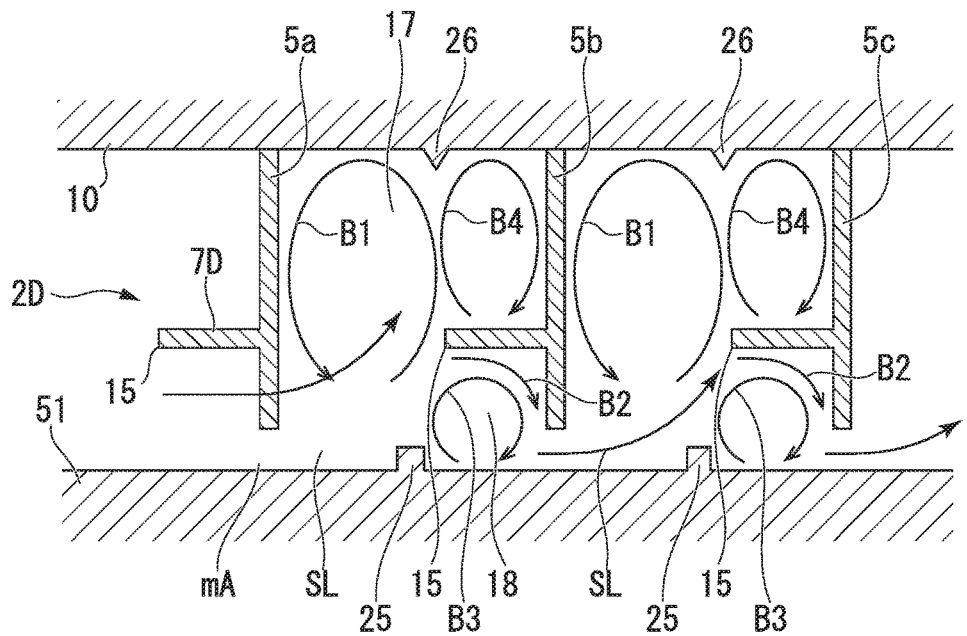
FIG. 11 is a sectional view of the seal structure of a second modification example of the fourth embodiment of the invention.

As shown in FIG. 11, the seal structure 2D of the second modification example of the fourth embodiment has a configuration in which the rotational-side protruding strip part 25 of the seal structure 2C of the third embodiment is provided in addition to the configuration of the seal structure of the first modification example.

According to the above modification example, the blowout of the leak jet SL can be prevented in addition to the effects of the first modification example of the fourth embodiment. Additionally, by the eddy B3 created in the second cavity 18, the dissipation of kinetic energy is promoted, the contraction current becomes strong, and the flow rate of the leak jet SL can be further reduced.

Fifth Embodiment

Hereinafter, a seal structure of a fifth embodiment of the invention will be described with reference to a drawing. In addition, the present embodiment will be described mainly about differences from the above-described first embodiment, and the description of the same portions will be omitted.

Figure 12:
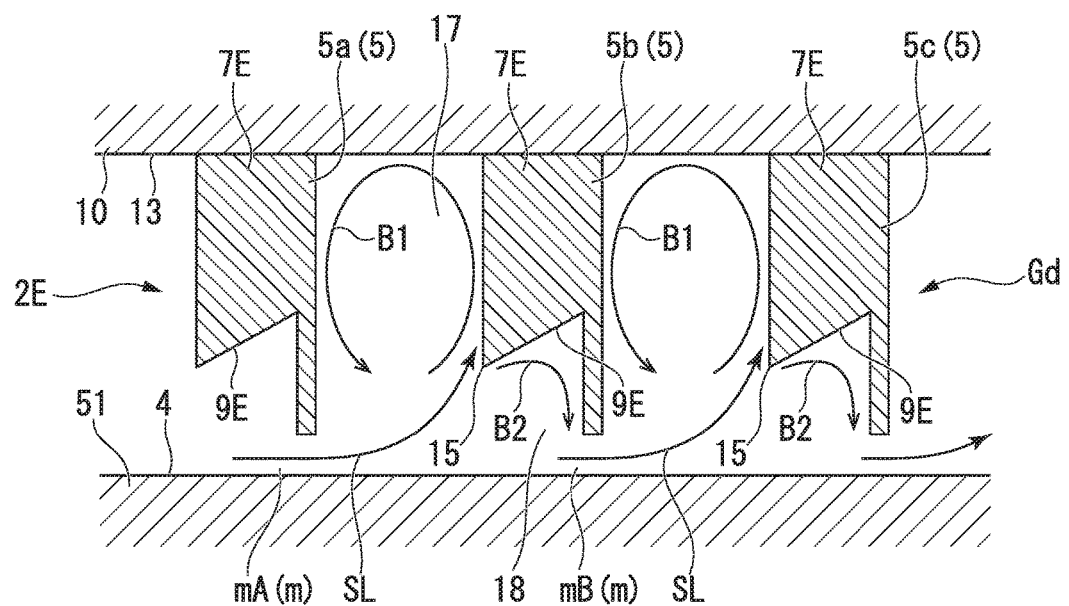
FIG. 12 is a sectional view of a seal structure of a fifth embodiment of the invention.

As shown in FIG. 12, a cylindrical surface 9E of a projection 7E of the seal structure 2E of the present embodiment is formed so that the distance from the outer peripheral surface 4 of the shroud 51 become larger toward the downstream side. That is, the projection 7E of the present embodiment is formed in a shape in which a cut such that the depth of the second cavity 18 becomes larger from the re-adhesion edge 15 toward the downstream side is made in the projection 7 of the first embodiment.

The position of the re-adhesion edge 15 is defined by the same method used for the re-adhesion edge 15 of the first embodiment.

According to the above embodiment, the effect of diffusing the leak jet SL is enhanced, and the leak jet SL that passes through the downstream gap mB can be reduced.

Although the embodiments of the invention have been described above in detail with reference to the drawings, the respective components, combinations thereof, or the like in the respective embodiments are mere examples. Additions, omissions, substitutions, and other modifications of the components can be made without departing from the spirit of the invention. Additionally, the invention is not limited by the embodiments, and is limited only by the scope of the claims.

For example, in the above respective embodiments, the labyrinth seal is constituted of the shroud 51 provided on the tip side (rotational side) of each blade 50, and the seal fins 5 provided on the bottom surface 13 (stationary side) of the annular groove 12. However, the labyrinth is not limited to this. For example, the seal fins may be provided on a blade side that is the rotational side.

Additionally, the invention may be applied to a labyrinth seal that seals a gap between the rotating shaft on which no blade is provided, and the casing. For example, the invention can be applied to a shaft seal between a turbine casing and a rotor, a seal between blade casings of an axial compressor, a seal between centrifugal compressor casing impellers, and the like.

In other words, the seal structures of the above respective embodiment are applicable to a rotating machine including a second structure body that faces a first structure body in a radial direction via a gap and rotates relative to the first structure body around an axis line, and a plurality of seal fins that are provided in any one of the first structure body and the second structure body, protrude toward the other structure body to form minute gaps together with the other structure body, and are provided at intervals in the axis line direction.

REFERENCE SIGNS LIST

1: STEAM TURBINE (ROTATING MACHINE)
2, 2B, 2C, 2D, 2E: SEAL STRUCTURE
4: OUTER PERIPHERAL SURFACE
5, 5a, 5b, 5c: SEAL FIN
7, 7B, 7C, 7D, 7E: PROJECTION (PROTRUSION)
8: DISK SURFACE
9, 9E: CYLINDRICAL SURFACE
10: CASING (FIRST STRUCTURE BODY, SECOND STRUCTURE BODY)
11: OUTER PARTITION PLATE RING
12: ANNULAR GROOVE
13: BOTTOM SURFACE
15: RE-ADHESION EDGE
17: FIRST CAVITY
18: SECOND CAVITY
19: THIRD CAVITY
24: FIN-SIDE PROTRUDING STRIP PART
25: ROTATIONAL-SIDE PROTRUDING STRIP PART (THIRD PROTRUDING STRIP PART)
26: TRIANGULAR PROTRUDING STRIP PART (SECOND PROTRUDING STRIP PART)
30: ROTATING SHAFT
31: ROTATING SHAFT BODY
40: VANE
50: BLADE
51: SHROUD (FIRST STRUCTURE BODY, SECOND STRUCTURE BODY)
60: BEARING SECTION
61: JOURNAL BEARING UNIT
62: THRUST BEARING UNIT
B1, B3, B4: EDDY
B2: CURRENT
CL: CLEARANCE
Gd: GAP
H1, H2: DEPTH
m: MINUTE GAP
mA: UPSTREAM GAP (CLEARANCE)
mB: DOWNSTREAM GAP (CLEARANCE)
L1: FIN PITCH
L2: WIDTH
O: AXIS LINE
S: STEAM
SL: LEAK JET (LEAK CURRENT)

What is claimed is:

1. A seal structure for sealing a gap between a first structure body and a second structure body facing the first structure body in a radial direction and rotating relative to the first structure body around an axis line, the seal structure comprising:
a peripheral surface having a cylindrical shape and that is formed on one of the first structure body and the second structure body and is parallel to the axis line;
a plurality of seal fins that are provided in the other of the first structure body and the second structure body, protrude toward the peripheral surface, form clearances together with the peripheral surface, and are provided at intervals in the axis line direction; and
a protrusion that forms a re-adhesion edge, to which a leak current having passed through a clearance of an upstream seal fin readheres, between the seal fins adjacent to each other in the axis line direction, and that forms a first cavity where an eddy flowing along the upstream seal fin toward the peripheral surface is created, and a second cavity where a current causing a contraction current effect on the clearance by colliding against a downstream seal fin and flowing toward the clearance is created,
wherein the width of the downstream seal fin in the axis line direction is smaller than that of the protrusion in the axis line direction.

2. The seal structure according to claim 1,
wherein the protrusion includes a member having a disk surface that is connected to an upstream side of each of the seal fins and extends between the other structure body and the re-adhesion edge, and a cylindrical surface that is a surface of a cylinder concentric with the axis line extending between the re-adhesion edge and the seal fin, and having a cross section of rectangular shape when seen from a circumferential direction.

3. The seal structure according to claim 2,
wherein the re-adhesion edge of the protrusion is a protruding strip that protrudes from the cylindrical surface toward the peripheral surface and extends in the circumferential direction.

4. The seal structure according to claim 1,
wherein the protrusion is a cylindrical member that is connected to the upstream surface of each of the seal fins and is concentric with the axis line extending between the re-adhesion edge and the seal fin, and that forms a third cavity where an eddy is formed between the protrusion and the surface of the other structure body.

5. The seal structure according to claim 4,
wherein a second protruding strip part, which protrudes toward the peripheral surface, extends in a circumferential direction and which promotes creation of an eddy created in the third cavity, is formed between the upstream seal fin and the re-adhesion edge in the axis line direction on the surface of the other structure body between the pair of seal fins adjacent to each other in the axis line direction.

6. The seal structure according to claim 1,
wherein a third protruding strip part, which protrudes toward the other surface, which extends in a circumferential direction, and which creates an eddy causing a contraction current effect on the clearance of the downstream seal fin in the second cavity, is formed between the upstream seal fin and the re-adhesion edge in the axis line direction on the surface of the peripheral surface between the pair of seal fins adjacent to each other in the axis line direction.

7. A rotating machine comprising:
the seal structure according to claim 1.

8. A seal structure for sealing a gap between a first structure body and a second structure body facing the first structure body in a radial direction and rotating relative to the first structure body around an axis line, the seal structure comprising:

a peripheral surface that is formed on one of the first structure body and the second structure body and is parallel to the axis line;
a plurality of seal fins that are provided in the other of the first structure body and the second structure body, protrude toward the peripheral surface, form clearances together with the peripheral surface, and are provided at intervals in the axis line direction; and
a protrusion that forms a re-adhesion edge, to which a leak current having passed through a clearance of an upstream seal fin readheres, between the seal fins adjacent to each other in the axis line direction, and that forms a first cavity where an eddy flowing along the upstream seal fin toward the peripheral surface is created, and a second cavity where a current causing a contraction current effect on the clearance by colliding against a downstream seal fin and flowing toward the clearance is created,
wherein a third protruding strip part, which protrudes toward the other surface, which extends in a circumferential direction, and which creates an eddy causing a contraction current effect on the clearance of the downstream seal fin in the second cavity, is formed between the upstream seal fin and the re-adhesion edge in the axis line direction on the surface of the peripheral surface between the pair of seal fins adjacent to each other in the axis line direction.

* * * * *